(12) United States Patent
Ochiai et al.

(10) Patent No.: US 8,727,371 B2
(45) Date of Patent: May 20, 2014

(54) AIRBAG APPARATUS OF VEHICLE

(71) Applicant: Honda Motor Co., Ltd, Tokyo (JP)

(72) Inventors: Fumiharu Ochiai, Wako (JP); Daiei Tonooka, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/748,738

(22) Filed: Jan. 24, 2013

(65) Prior Publication Data
US 2013/0214514 A1 Aug. 22, 2013

(30) Foreign Application Priority Data
Feb. 22, 2012 (JP) .................................. 2012-036176

(51) Int. Cl.
 *B60R 21/213* (2011.01)
(52) U.S. Cl.
 USPC ..................................... 280/728.2; 280/730.2
(58) Field of Classification Search
 USPC ............................................ 280/728.2, 730.2
 IPC ......................................... B60R 21/213,21/214
 See application file for complete search history.

(56) References Cited

U.S. PATENT DOCUMENTS

| | | | | |
|---|---|---|---|---|
| 6,142,509 A * | 11/2000 | White et al. | ................ | 280/730.2 |
| 6,254,123 B1 * | 7/2001 | Urushi et al. | ................ | 280/730.2 |
| 6,305,707 B1 * | 10/2001 | Ishiyama et al. | ............ | 280/728.2 |
| 6,485,048 B2 * | 11/2002 | Tajima et al. | ............... | 280/728.2 |
| 6,719,321 B2 * | 4/2004 | Yasuhara et al. | ........... | 280/730.2 |
| 6,796,576 B2 * | 9/2004 | Aoki et al. | ................. | 280/730.2 |
| 7,011,337 B2 * | 3/2006 | Aoki et al. | ................. | 280/730.2 |
| 7,077,424 B2 * | 7/2006 | Inoue | .......................... | 280/730.2 |
| 7,097,200 B2 * | 8/2006 | Wold | ........................... | 280/730.2 |
| 7,175,196 B2 * | 2/2007 | Boxey | ......................... | 280/730.2 |
| 7,246,817 B2 * | 7/2007 | Tanase | ........................ | 280/730.2 |
| 7,322,601 B2 * | 1/2008 | Bertossi | ..................... | 280/730.2 |
| 7,862,075 B2 * | 1/2011 | Minamikawa | ............. | 280/730.1 |
| 7,896,389 B2 * | 3/2011 | Jang et al. | .................. | 280/730.2 |
| 2002/0158451 A1 * | 10/2002 | Nusshor | ..................... | 280/730.2 |
| 2004/0256843 A1 * | 12/2004 | Totani et al. | ............... | 280/730.2 |
| 2006/0138750 A1 * | 6/2006 | Park | ........................... | 280/728.2 |
| 2006/0267315 A1 * | 11/2006 | White, Jr. | ................... | 280/730.2 |
| 2010/0327563 A1 * | 12/2010 | Ruedisueli et al. | ........ | 280/728.2 |

FOREIGN PATENT DOCUMENTS

| | | | | |
|---|---|---|---|---|
| JP | 2004098770 A | * | 4/2004 | ............. B60R 21/22 |
| JP | 2009-255726 A | | 11/2009 | |

* cited by examiner

*Primary Examiner* — Ruth Ilan
*Assistant Examiner* — Laura Freedman
(74) *Attorney, Agent, or Firm* — Westerman, Hattori, Daniels & Adrian, LLP

(57) ABSTRACT

An airbag apparatus includes a fixing bracket fixed to an upper portion of the side wall of a vehicle. The fixing bracket has an inflator support portion that supports an inflator, a fastening portion fastened and fixed to the upper portion of the side wall of the vehicle at a position below the inflator, and a restraining wall that extends along the axis direction of the fastening portion under the inflator. An airbag body is disposed between the inflator and an upper wall portion of the restraining wall, and the airbag body is compressed by the inflator and the upper wall portion and held between the inflator and the upper wall portion. The restraining wall restrains displacement of the airbag body so that the airbag body does not overlap a fastening operation area into which the fixing bracket is fastened.

11 Claims, 8 Drawing Sheets

AIRBAG APPARATUS OF VEHICLE

CROSS REFERENCES TO RELATED APPLICATIONS

The present application claims priority under 35 U.S.C. §119 to Japanese Patent Application No. 2012-036176, filed Feb. 22, 2012, entitled "Airbag Apparatus of Vehicle." The contents of this application are incorporated herein by reference in their entirety.

TECHNICAL FIELD

The present disclosure relates to an airbag apparatus of a vehicle for protecting a passenger by deploying an airbag in a curtain shape on the side of a vehicle compartment when an impact shock is input.

BACKGROUND

An airbag apparatus of a vehicle including a folded airbag body attached to an upper portion of an interior side wall of a vehicle and deployed into a curtain shape between the side wall of the vehicle body and a passenger when an impact shock is input to the vehicle has been developed (refer to, for example, Japanese Unexamined Patent Application Publication No. 2009-255726).

SUMMARY

An airbag body has an inflator connected thereto. The inflator generates high pressure gas when an impact shock is input. In the above-described airbag apparatuses that deploy an airbag in the side portion of the vehicle body, the inflator is attached to a rear pillar portion or a roof side rail portion. If the inflator is attached to a roof side rail portion, the inflator is disposed on an upper portion of the folded airbag body along a lengthwise direction of the airbag body due to restriction of an installation space. In order to dispose the inflator on the folded airbag body, a fixing bracket used to fix the inflator to the vehicle body is mounted so as to extend around to the back of the folded airbag body. The extended portion that extends to the back of the folded airbag body is fastened to the roof side rail portion by a bolt.

Accordingly, in order to fasten the fixing bracket to the upper portion of the side wall of the vehicle body by a bolt after the airbag body is mounted along the upper portion of the side wall of the vehicle body, part of the airbag body located in front of the bolt fastening portion needs to be urged downward, and the fixing bracket is fastened through a space formed after the part of the airbag body is urged downward. However, if part of the airbag body is urged downward and the fixing bracket is fastened, the fastening operation is significantly troublesome since the airbag body may be accidentally engaged in a fastener member or a fastening tool.

To solve such a problem, the fixing bracket may be extended downward beyond the fastening point of the airbag body, and a portion of the fixing bracket located under the airbag body is fastened. However, in such a case, a distance between a portion of the fixing bracket that supports the inflator and the portion at which the fixing bracket is fastened is increased and, therefore, the rigidity of the fixing bracket is decreased. As a result, a resonance frequency of the inflator caused by the fixing bracket serving as a spring decreases and, therefore, unwanted resonance easily occurs when the vehicle is running.

Accordingly, the present disclosure provides an airbag apparatus of a vehicle capable of facilitating an operation for fastening a fixing bracket to an upper portion of the side wall of a vehicle body. In the following explanation of the exemplary embodiment, specific elements with their reference numerals are indicated by using brackets. These specific elements are presented as mere examples in order to facilitate understanding, and thus, should not be interpreted as any limitation to the accompanying claims.

According to an embodiment of the present disclosure, an airbag apparatus of a vehicle includes an airbag body (e.g., an airbag body 2 according to an exemplary embodiment) that is folded and attached on an upper portion of an interior side wall of the vehicle (e.g., a roof side rail 4 according to the exemplary embodiment), where the airbag body is deployed from the upper portion of the side wall into a curtain shape if an impact shock is input to the vehicle, an inflator (e.g., an inflator 6 according to the exemplary embodiment) disposed on an upper portion of the folded airbag body along a lengthwise direction of the airbag body, where the inflator supplies high pressure gas to the airbag body when the impact shock is input to the vehicle, and a fixing bracket (e.g., a fixing bracket 8 according to the exemplary embodiment) that fixes the inflator to the upper portion of the side wall at a position below the inflator. The fixing bracket includes a fastening portion (e.g., a fastening portion 19 according to the exemplary embodiment) that is fixed to the upper portion of the side wall at a position below the inflator using a bolt and a restraining wall (e.g., a pair of restraining walls 15 according to the exemplary embodiment) that extends along a fastener axis direction of the fastening portion at a position below the inflator and that restrains downward displacement of the folded airbag body. In such a configuration, the restraining wall of the fixing bracket can restrain displacement of the airbag body in the axis direction of the fastening portion. Accordingly, even when a distance between an inflator support portion of the fixing bracket and the fastening portion is decreased, the airbag body does not enter a working area when the fixing bracket is fastened and, therefore, a fastening operation is not interfered. As a result, the fixing bracket can be easily fastened to the upper portion of the side wall of the vehicle without increasing the distance between the inflator support portion and the fastening portion of the fixing bracket. Thus, a decrease in the rigidity of the fixing bracket can be prevented and, at the same time, the fastening operation can be facilitated.

In the above-described configuration, a distance between the inflator and the restraining wall can be set to a width of the folded airbag body that is compressed between the inflator and the restraining wall. In such a configuration, the fastening portion of the fixing bracket can be made close to the inflator by an amount of compression of the airbag body caused by the restraining wall of the fixing bracket. Accordingly, the extending length of the fixing bracket can be reduced and, therefore, the rigidity of the fixing bracket can be increased. In addition, a space occupied by the airbag body and the inflator in the upper portion of the side wall in the up-down direction can be reduced.

In the above-described configuration, the restraining wall can have a deformation allowance portion (e.g., an opening 40 according to the exemplary embodiment) that facilitates deformation of the restraining wall caused by a deployment pressure of the airbag body. In such a configuration, when the airbag body is deployed, deformation of the restraining wall is allowed by the deformation allowance portion. Thus, even when the airbag body is compressed by the inflator and the restraining wall and is held between the inflator and the restraining wall, deployment of the airbag body is not interfered by the restraining wall when the airbag apparatus operates.

In the above-described configuration, the deformation allowance portion can be a reduced-thickness portion formed in the restraining wall. In such a configuration, since the rigidity of the restraining wall is partially decreased by the presence of the reduced-thickness portion, deformation of the restraining wall can be facilitated when the airbag body is deployed.

In the above-described configuration, the reduced-thickness portion can be one of an opening and a notch formed in the restraining wall. In such a configuration, since the deformation allowance portion can be easily formed in the restraining wall by forming an opening or a notch in the restraining wall at a desired position, the manufacturing cost of the fixing bracket can be reduced.

BRIEF DESCRIPTION OF THE DRAWINGS

The advantages of the disclosure will become apparent in the following description taken in conjunction with the following drawings.

DETAILED DESCRIPTION

Figure 1:
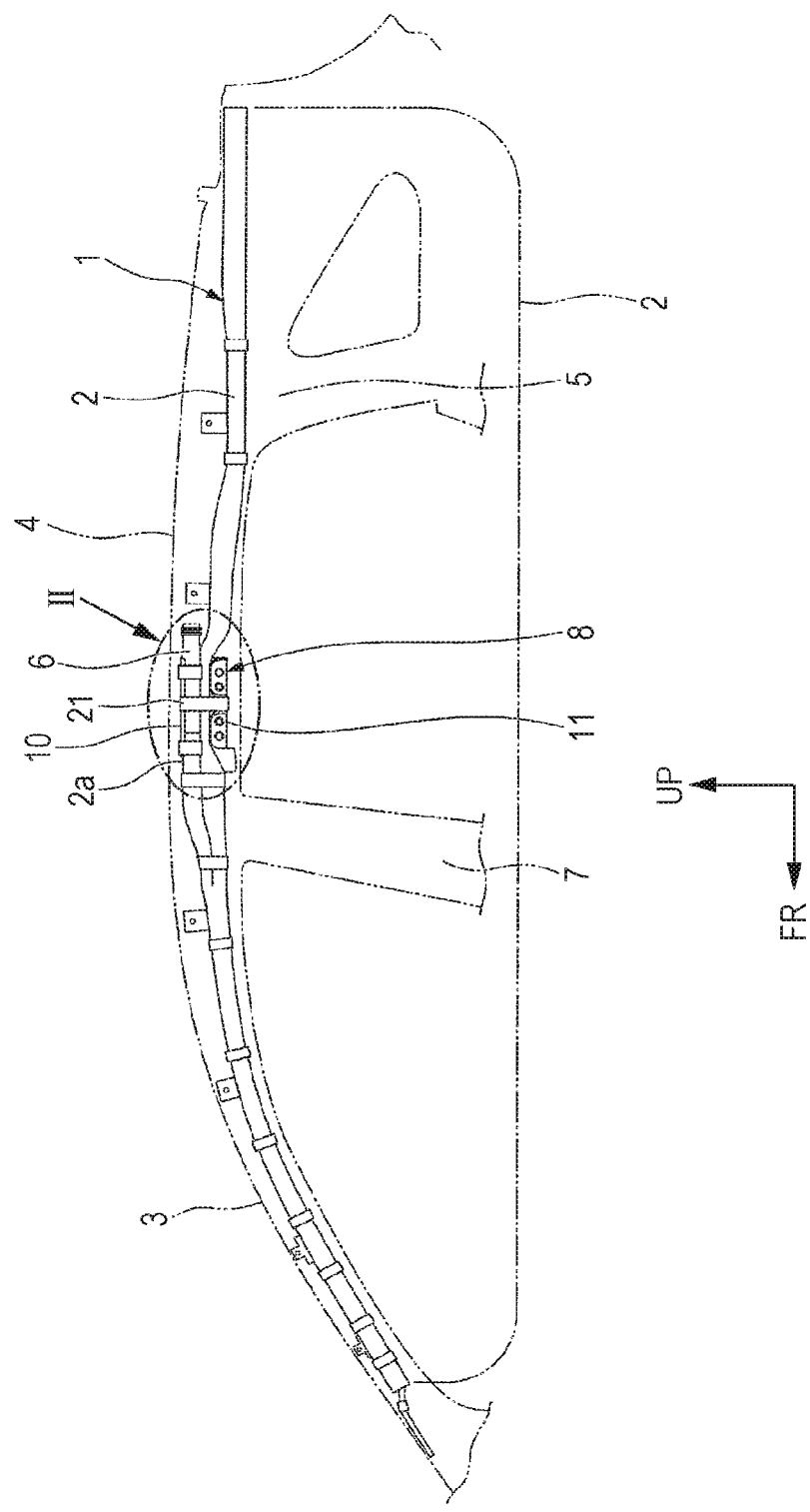
FIG. 1 is a side view of an airbag apparatus when viewed from the interior of a vehicle, according to an embodiment of the present disclosure.

Exemplary embodiments of the present disclosure are described below with reference to the accompanying drawings. In the following exemplary embodiments, the terms front, rear, up, and down refer to the front, rear, up, and down of the vehicle, unless expressly specified otherwise. In addition, an arrow FR in the drawings indicates the front direction of the vehicle, an arrow UP indicates the upward direction of the vehicle, and an arrow RI indicates an interior direction of the vehicle.

An exemplary embodiment illustrated in FIGS. 1 to 4 is described first. FIG. 1 is a schematic side view of an airbag apparatus 1 installed in a vehicle when viewed from the interior of the vehicle. The airbag apparatus 1 includes a folded airbag body 2 (a bag member) mounted on an upper portion of a compartment of the vehicle from a front pillar 3 to a rear pillar 5 of the vehicle body via a roof side rail 4 (i.e., the upper portion of the side wall of the vehicle). If an impact shock that is greater than a predetermined value is input to the vehicle, the folded airbag body 2 is deployed into a curtain shape on a side of the vehicle compartment, as indicated by an imaginary line illustrated in FIG. 1. The folded airbag body 2 is secured to the upper portion of the side wall of the vehicle body at a plurality of points.

The airbag apparatus 1 includes the airbag body 2 and an inflator 6. The inflator 6 supplies a high pressure gas to the airbag body 2 when an impact shock that is greater than the predetermined value is input. The inflator 6 has a substantially cylindrical shape. The inflator 6 is attached to a substantially middle portion of the roof side rail 4 in the front-rear direction of the vehicle (an upper portion in the vicinity of a center pillar 7) along substantially the front-rear direction. According to the present exemplary embodiment, the airbag body 2 has a gas inlet portion 2a in substantially the middle thereof in the lengthwise direction. The inflator 6 has a gas supply port (not illustrated) disposed above the airbag body 2. The gas supply port is connected to the gas inlet portion 2a of the airbag body 2.

Figure 2:
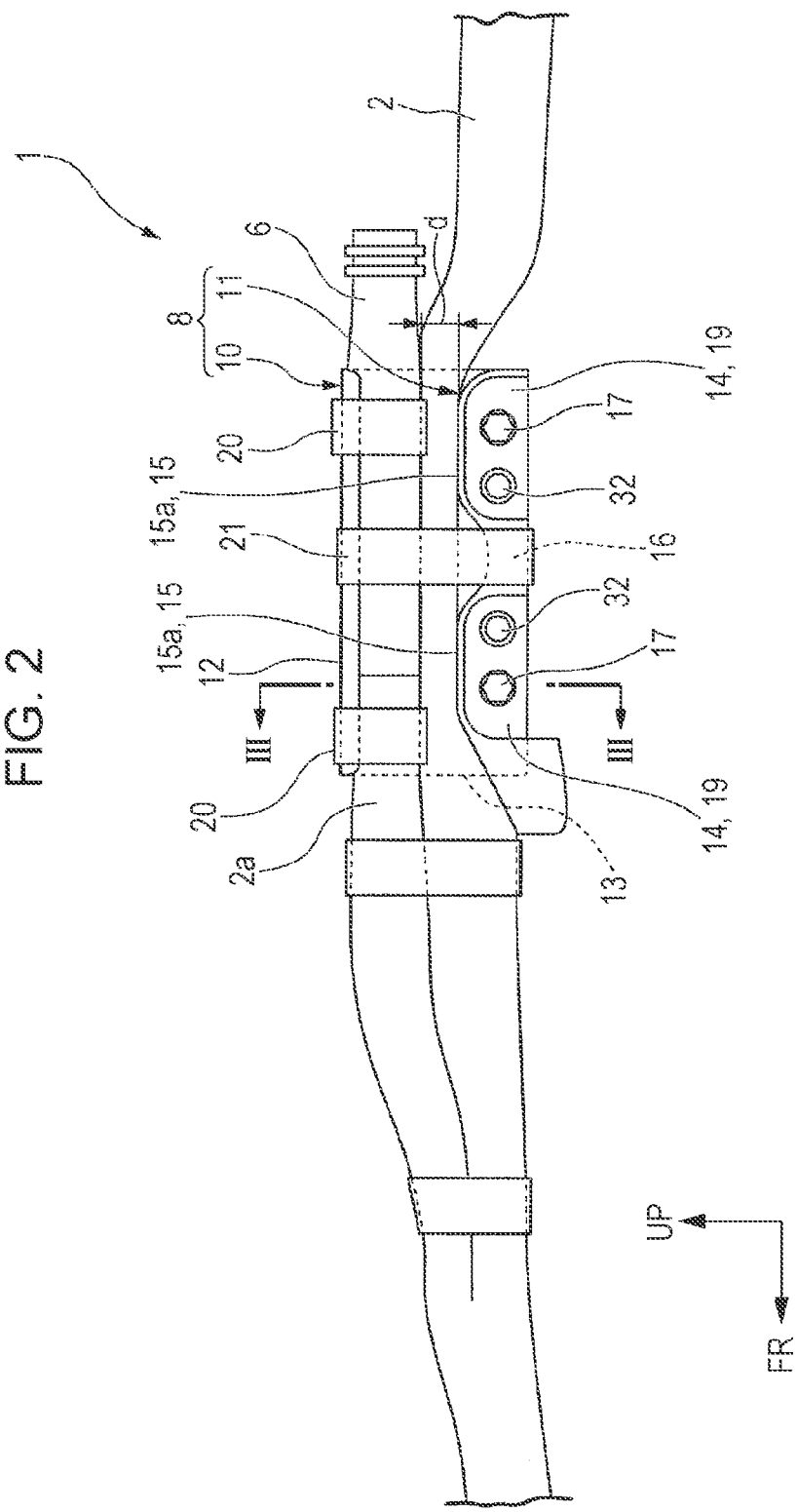
FIG. 2 is an enlarged view of an area II of the airbag apparatus illustrated in FIG. 1 according to the embodiment of the present disclosure.
Figure 3:
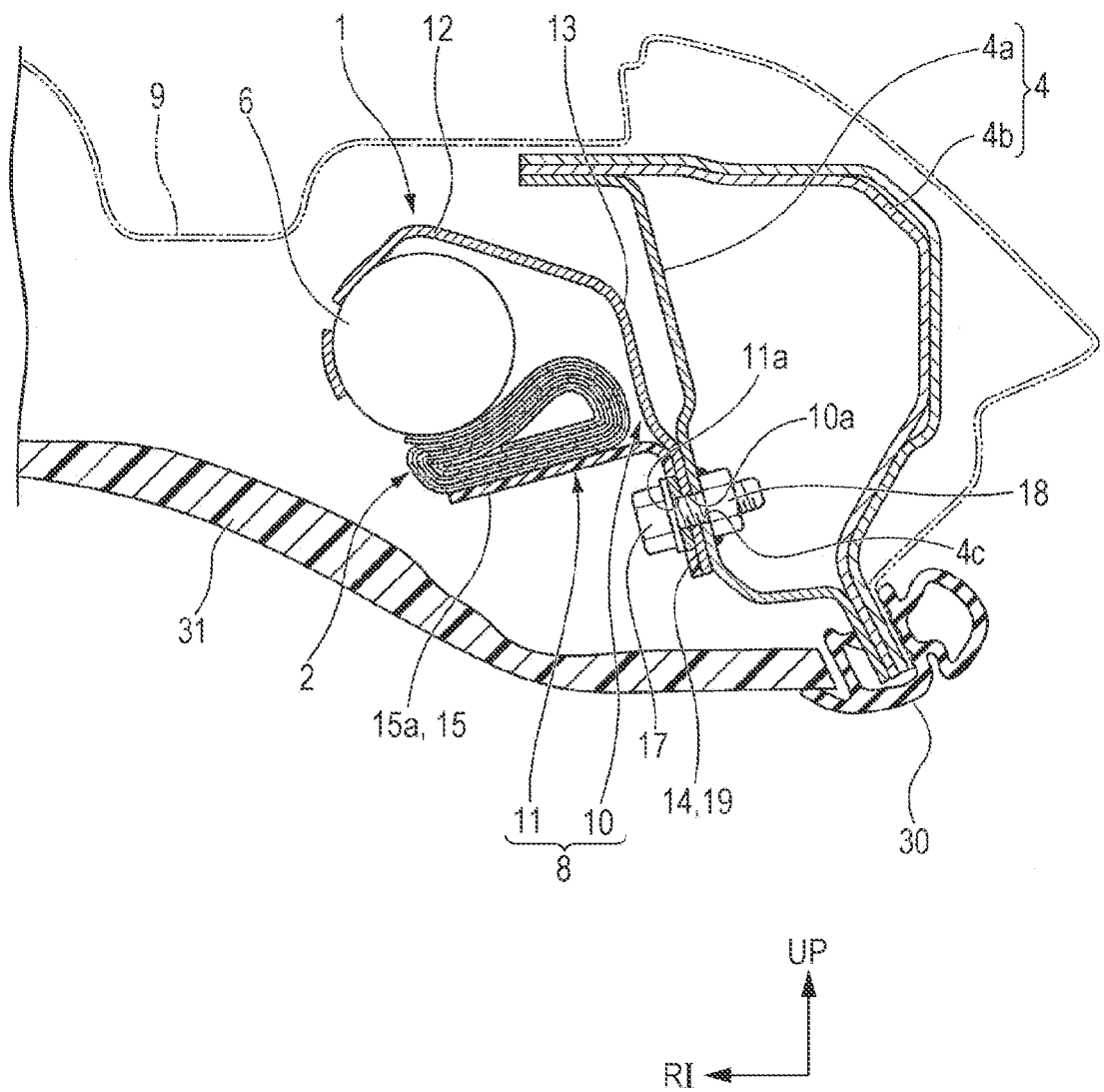
FIG. 3 is a cross-sectional view of the airbag apparatus taken along a line III-III of FIG. 2 according to the embodiment of the present disclosure.
Figure 4:
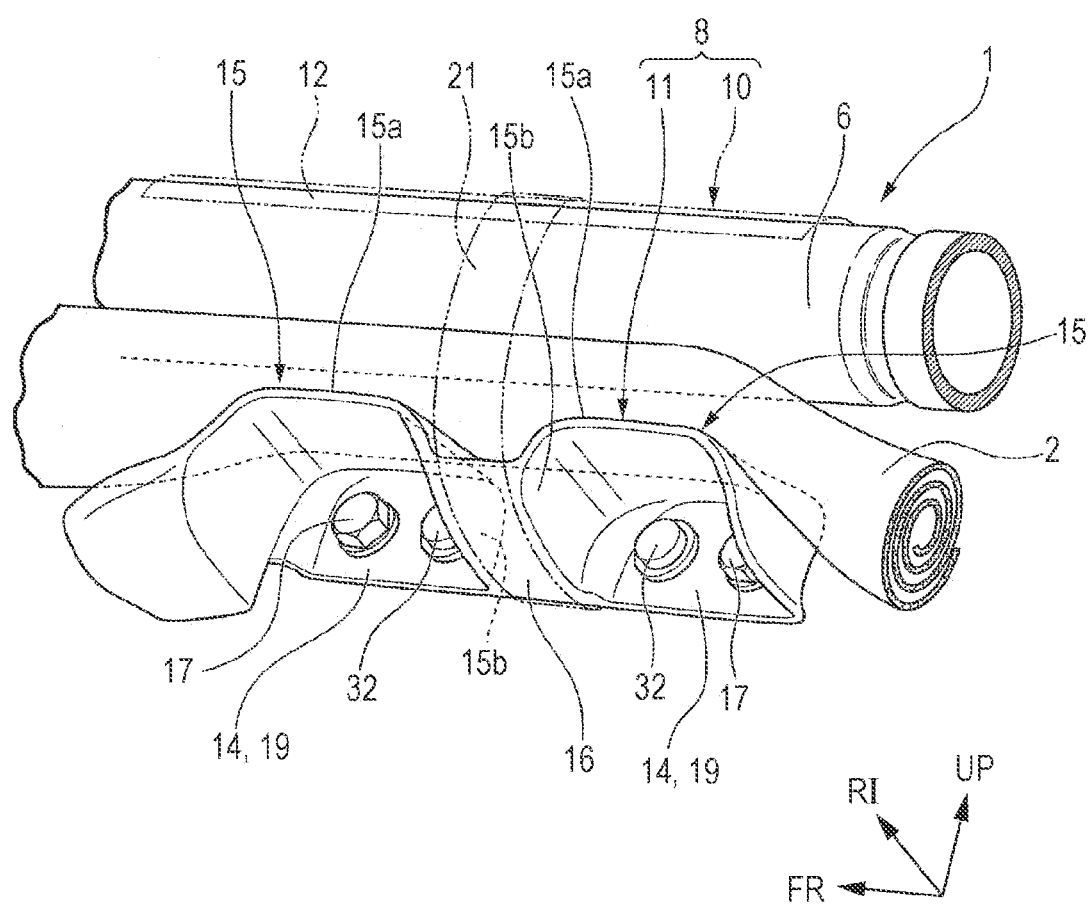
FIG. 4 is a perspective view of the area II of the airbag apparatus illustrated in FIG. 1 according to the embodiment of the present disclosure.

FIG. 2 is an enlarged view of an area II illustrated in FIG. 1. FIG. 3 is a cross-sectional view taken along a line III-III of FIG. 2. FIG. 4 is a perspective view of the area II illustrated in FIG. 1. The inflator 6 is attached to a side surface of the roof side rail 4 on the interior side using a fixing bracket 8. As illustrated in FIG. 3, the roof side rail 4 is formed by joining the upper and lower ends of an inner panel 4a to the upper and lower ends of an outer panel 4b. The roof side rail 4 has an elongated rectangular shape in cross section. An upper joint end of the roof side rail 4 is bent inward in the vehicle width direction so as to be substantially horizontal and is joined to a roof panel 9 via a joint panel (not illustrated). In addition, a lower joint end of the roof side rail 4 has a molding 30. A side edge portion of a roof lining 31 in the compartment of the vehicle is in contact with the molding 30. The interior sides of the inflator 6 and the airbag body 2 attached to the roof side rail 4 are covered by the side edge portion of the roof lining 31. When the airbag body 2 is deployed, the side edge portion of the roof lining 31 is pushed open downward.

A fixing bracket 8 includes a metal first bracket member 10 that supports the inflator 6 and a plastic second bracket 11 attached to the lower edge side surface of the first bracket member 10 on the interior side thereof.

The first bracket member 10 has an inflator support portion 12 at the upper edge thereof. The inflator support portion 12 supports the inflator 6. A base wall 13 continuously extends from the lower end of the inflator support portion 12. The lower edge of the base wall 13 is formed so as to be substantially flat. The lower edge of the base wall 13 is disposed on the interior side surface of the roof side rail 4 and is fixed to the interior side surface.

The second bracket 11 includes a pair of joint walls 14, a pair of restraining walls 15, and a connection wall 16. The joint walls 14 are disposed on the lower edge of the base wall 13 of the first bracket member 10 from the interior side. Each of the restraining walls 15 extends from the peripheral portion of one of the joint walls 14 in an interior direction RI so as to surround the top edge and the both side edges of the joint wall 14. The connection wall 16 connects the end portions of the neighboring restraining walls 15 to each other. Note that the two joint walls 14 are formed so as to be substantially horizontally arranged in the front-rear direction of the vehicle when the fixing bracket 8 is attached to the vehicle body.

Each of the joint walls 14 of the second bracket 11 is disposed on the lower edge of the base wall 13 of the first bracket member 10 and is fixed to the base wall 13 of the first bracket member 10 using a clip 32. In addition, as illustrated in FIG. 3, a through-hole 11a is formed in each of the joint walls 14 of the second bracket 11, and through-holes 10a are formed in the lower edge of the base wall 13 of the first bracket member 10. In order to fix the bracket, a bolt 17 is inserted into one of the through-holes 11a and corresponding one of the through holes 10a. The inner panel 4a of the roof side rail 4 has two through-holes 4c formed therein. Each of the through-hole 4c allows the bolt 17 to be inserted therethrough. The inner panel 4a further has two weld nuts 18 on the back side. The fixing bracket 8 is fastened and fixed to the side surface of the roof side rail 4 on the interior side by screwing the bolts 17 into the weld nuts 18. According to the present exemplary embodiment, the joint walls 14 of the second bracket 11 and the lower edge portion of the first bracket member 10 on which the joint walls 14 are disposed form a fastening portion 19, which is joined to the roof side rail 4 on the vehicle body side (the upper portion of the side wall) using a bolt.

In addition, as illustrated in FIGS. 2 and 3, when the fastening portion 19 is joined to the roof side rail 4, the inflator support portion 12 of the first bracket member 10 has a curved shape in cross section such that the upper portion of the inflator support portion 12 is curved in the interior direction. The lower surface of the portion having the curved cross section supports the inflator 6. More specifically, when the inflator 6 is installed on the lower surface of the inflator support portion 12, the inflator 6 is joined to the inflator support portion 12 using, for example, a binding belt 20. In this manner, the inflator 6 attached to the inflator support portion 12 is disposed at a position immediately above an upper wall portion 15a of the restraining wall 15 of the second bracket 11 so as to be separated from the upper wall portion 15a by a predetermined distance d.

The substantially middle portion of the folded airbag body 2 in the lengthwise direction is inserted into between the inflator 6 and each of the upper wall portions 15a of the restraining walls 15. The predetermined distance d between the inflator 6 attached to the fixing bracket 8 and the restraining wall 15 is set to a value less than the diameter of a normal portion of the folded airbag body 2. Accordingly, the airbag body 2 inserted into between the inflator 6 and each of the restraining walls 15 is compressed in the up-down direction by a predetermined amount and is firmly held by the inflator 6 and the restraining wall 15.

In addition, as illustrated in FIGS. 2 and 4, the upper wall portion 15a of the restraining wall 15 is disposed above the height level of the lower surfaces of the installed airbag body 2 located in front and rear of the fixing bracket 8. Accordingly, portions of the airbag body 2 compressed between the inflator 6 and each of the restraining walls 15 are held higher than the lower surface of the portions of the installed airbag body 2 located in front and rear of the fixing bracket 8.

In addition, as described above, the connection wall 16 connects the two restraining walls 15 to each other on the interior side. More precisely, the restraining walls 15 have side wall portions 15b that face each other on the interior side, and the connection wall 16 connects the side wall portions 15b to each other. The connection wall 16 is gradually curved upward from the base end adjacent to the joint wall 14 to the top end adjacent to the inside of the compartment. The outer surface facing the inside of the compartment is a curved surface. When the airbag body 2 is assembled into the airbag apparatus 1, a breakable binding belt 21 is spanned across the curved surface of the connection wall 16 in order to hold the airbag body 2 on the fixing bracket 8.

The airbag apparatus 1 is assembled into the vehicle body in the following manner. That is, the inflator 6 is connected to the airbag body 2 into a unit first. Thereafter, the folded airbag body 2 is attached to a plurality of points in a region extending from the front pillar 3 to the rear pillar 5 via the roof side rail 4. At that time, the fixing bracket 8 is attached to the inflator 6. The middle portion of the airbag body 2 in the lengthwise direction is attached to the roof side rail 4 together with the fixing bracket 8.

The inflator 6 is fixed to the inflator support portion 12 of the first bracket member 10 of the fixing bracket 8, as described above. Thereafter, the airbag body 2 is compressed in the up-down direction by the restraining walls 15 of the second bracket 11 and the inflator 6. Subsequently, the second bracket 11 is disposed on the first bracket member 10, and the second bracket 11 and the first bracket member 10 are fixed to the roof side rail 4. At that time, the pair of joint walls 14 of the second bracket 11 is tentatively fixed to the lower edge portion of the base wall 13 of the first bracket member 10 using the clip 32 first. Thereafter, the joint walls 14 of the second bracket 11 are permanently fixed to the roof side rail 4 together with the first bracket member 10 using the bolt 17. That is, the second bracket 11 is permanently fixed to the first bracket member 10 by fastening the fixing bracket 8 to the roof side rail 4 using the bolt.

The fixing bracket 8 is bolted to the roof side rail 4 by engaging a tool with the head of the bolt 17 from the inside of the compartment. At that time, since the restraining wall 15 of the second bracket 11 extends in the area around the upper portion of the bolt 17 in the axis direction of the bolt 17, downward displacement of the airbag body 2 is restricted by the pair of restraining walls 15. As a result, contact of the tool and the bolt 17 with the airbag body 2 can be reliably prevented when the bolt 17 is screwed.

As described above, since the airbag apparatus 1 includes the fixing bracket 8 having the restraining walls 15 that prevent the airbag body 2 from entering a bolt fastening operation area, the fixing bracket 8 can be easily and reliably bolted to the roof side rail 4 without significantly separating the fastening portion 19 of the fixing bracket 8 downward from the inflator support portion 12. Thus, if the airbag apparatus 1 is employed, an extending length of the fixing bracket 8 from the inflator support portion 12 to the fastening portion 19 can be reduced and, therefore, a decrease in the rigidity of the fixing bracket 8 can be reduced. In this manner, resonance of the inflator 6 occurring when the vehicle is running can be prevented. As a result, the airbag apparatus 1 can prevent a decrease in the rigidity of the fixing bracket 8 and facilitate the fastening operation at the same time.

In addition, in the airbag apparatus 1 according to the present exemplary embodiment, the airbag body 2 is compressed and held between the inflator 6 and each of the restraining walls 15 of the fixing bracket 8. Accordingly, the fastening portion 19 of the fixing bracket 8 can be made close to the inflator 6. Thus, the extending length of the fixing bracket 8 from the inflator support portion 12 to the fastening portion 19 can be further reduced and, therefore, a decrease in the rigidity of the fixing bracket 8 can be further reduced. In addition, a space occupied by the airbag body 2 and the inflator 6 on the side portion of the roof side rail 4 in the up-down direction can be reduced. As a result, the airbag apparatus 1 is advantageous for reducing the resonance of the inflator 6. In addition, the airbag apparatus 1 can be easily applied to vehicles having a difficulty to provide a sufficient ceiling space above the roof lining 31.

Furthermore, in the airbag apparatus 1 according to the present exemplary embodiment, the restraining walls 15 (the second bracket 11) that urge the airbag body 2 upward and hold the airbag body 2 in cooperation with the inflator 6 are formed of a deformable plastic material. Accordingly, when an impact shock is input and, thus, the airbag body 2 is deployed, the restraining walls 15 are deflected and, therefore, deployment of the airbag body 2 is allowed.

Figure 5:
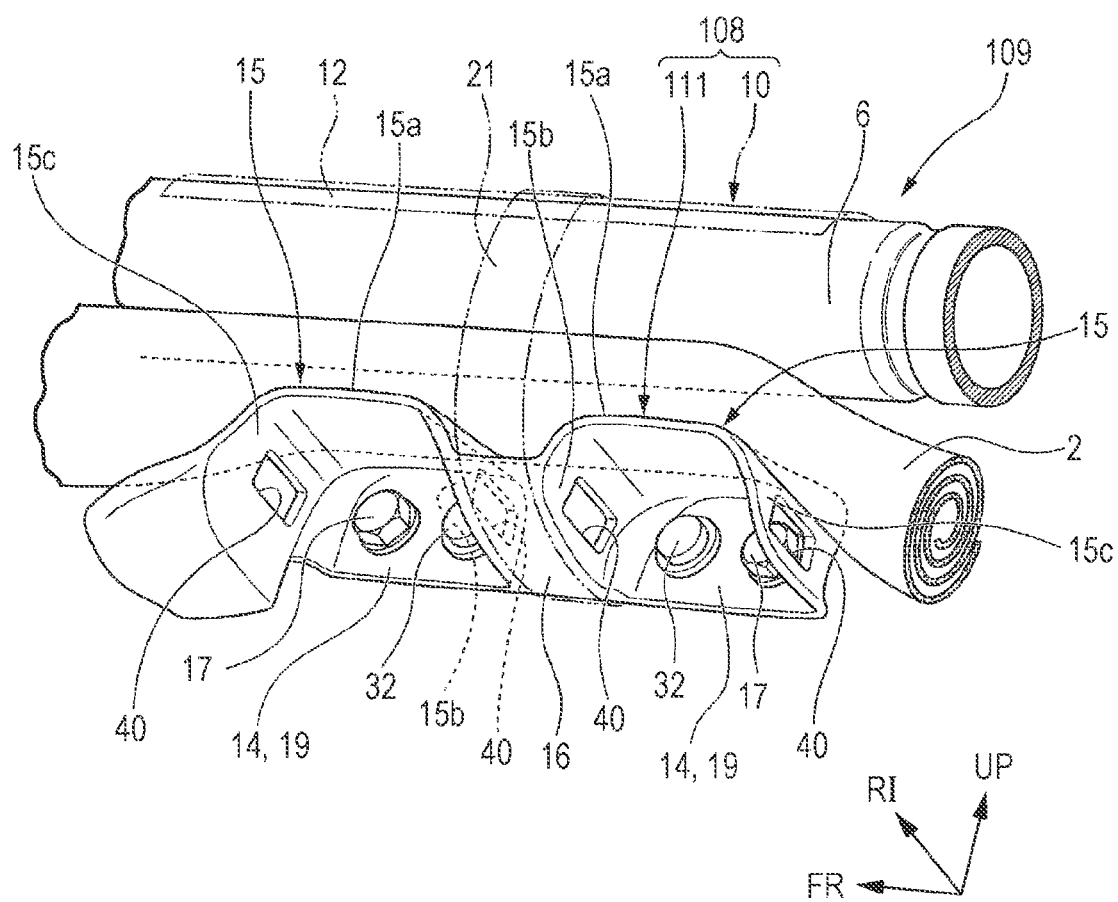
FIG. 5 is a perspective view of a portion of an airbag apparatus according to another embodiment of the present disclosure, which corresponds to the area II illustrated in FIG. 1.
Figure 6:
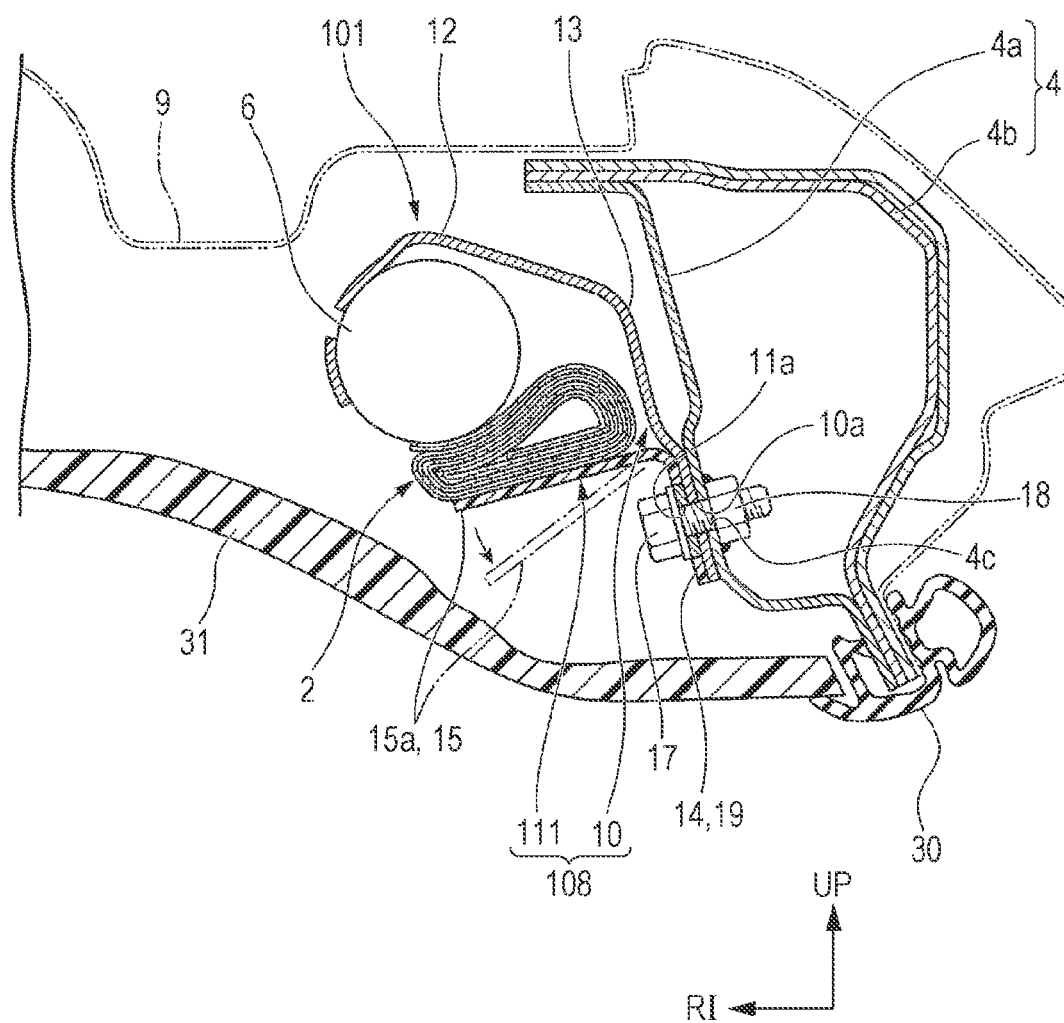
FIG. 6 is a cross-sectional view of the airbag apparatus according to the another embodiment of the present disclosure, which corresponds to FIG. 4.

Another exemplary embodiment illustrated in FIGS. 5 and 6 is described next. Note that in the following exemplary embodiment, the same numbering is used for elements which were previously shown in the above-described exemplary embodiment, and descriptions of the elements are not repeated. According to the present exemplary embodiment, an airbag apparatus 101 has a structure that is basically similar to that of the above-described exemplary embodiment. However, the structure of a second bracket member 111 that forms a fixing bracket 108 slightly differs from the fixing bracket in the above-described exemplary embodiment. That is, the second bracket member 111 is formed from a plastic material. The second bracket member 111 includes a pair of joint walls 14, a pair of restraining walls 15, and a connection wall 16. In addition, an opening 40 having a substantially square shape is formed in the center of each of two side wall portions 15b and 15c of each of the restraining walls 15.

According to the present exemplary embodiment, the airbag apparatus 101 can provide an advantage that is the same as that in the above-described exemplary embodiment. Since the opening 40 having a substantially square shape is formed at the center of each of the two side wall portions 15b and 15c of each of the restraining walls 15, the upper wall portion 15a of each of the restraining walls 15 can be easily deformed by the deployment pressure of the airbag body 2, as indicated by a dotted line in FIG. 6, when the airbag body 2 is deployed. That is, according to the present exemplary embodiment, since the rigidity of the side wall portions 15b and 15c of each of the restraining walls 15 is decreased by the presence of the opening 40 having a substantially square shape, the upper wall portion 15a is easily deformed and deflected downward when a deployment pressure of the airbag body 2 is applied to the upper wall portion 15a.

Figure 7:
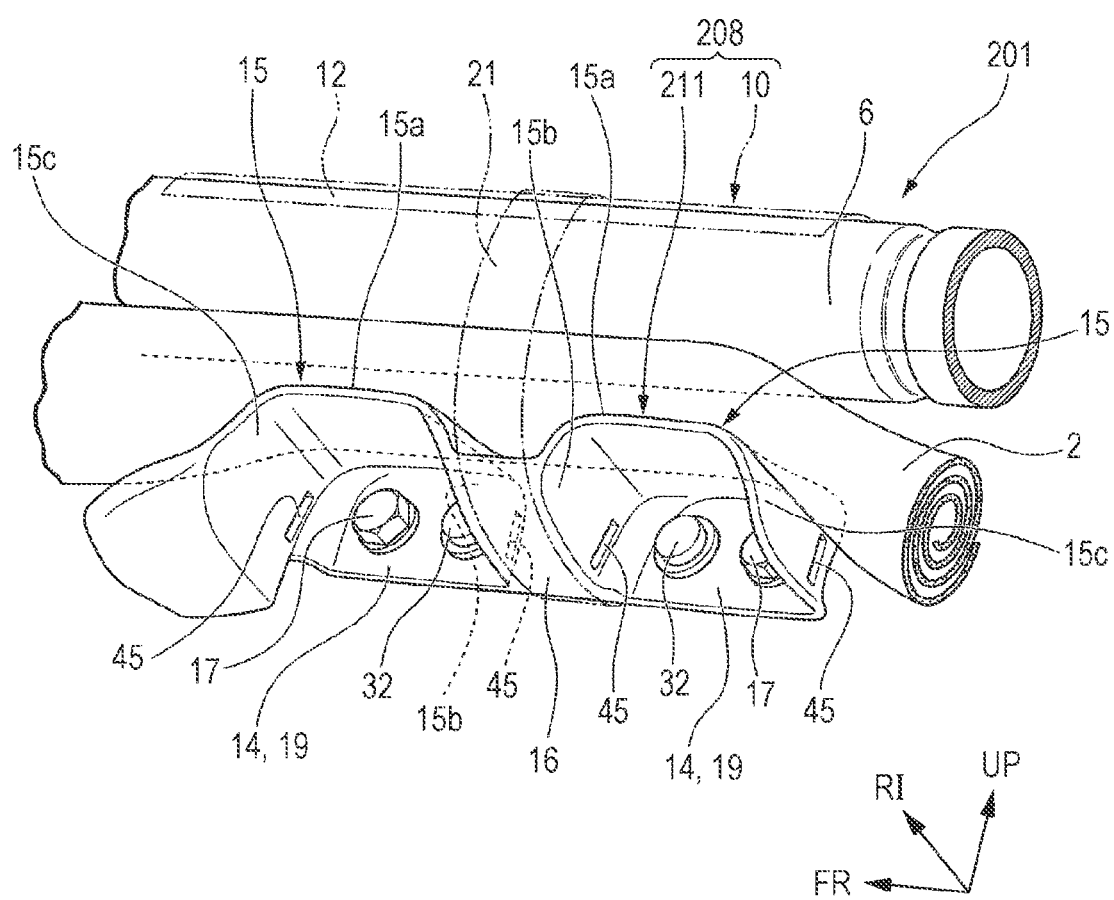
FIG. 7 is a perspective view of a portion of an airbag apparatus according to a modification of the another embodiment of the present disclosure, which corresponds to the area II illustrated in FIG. 1.
Figure 8:
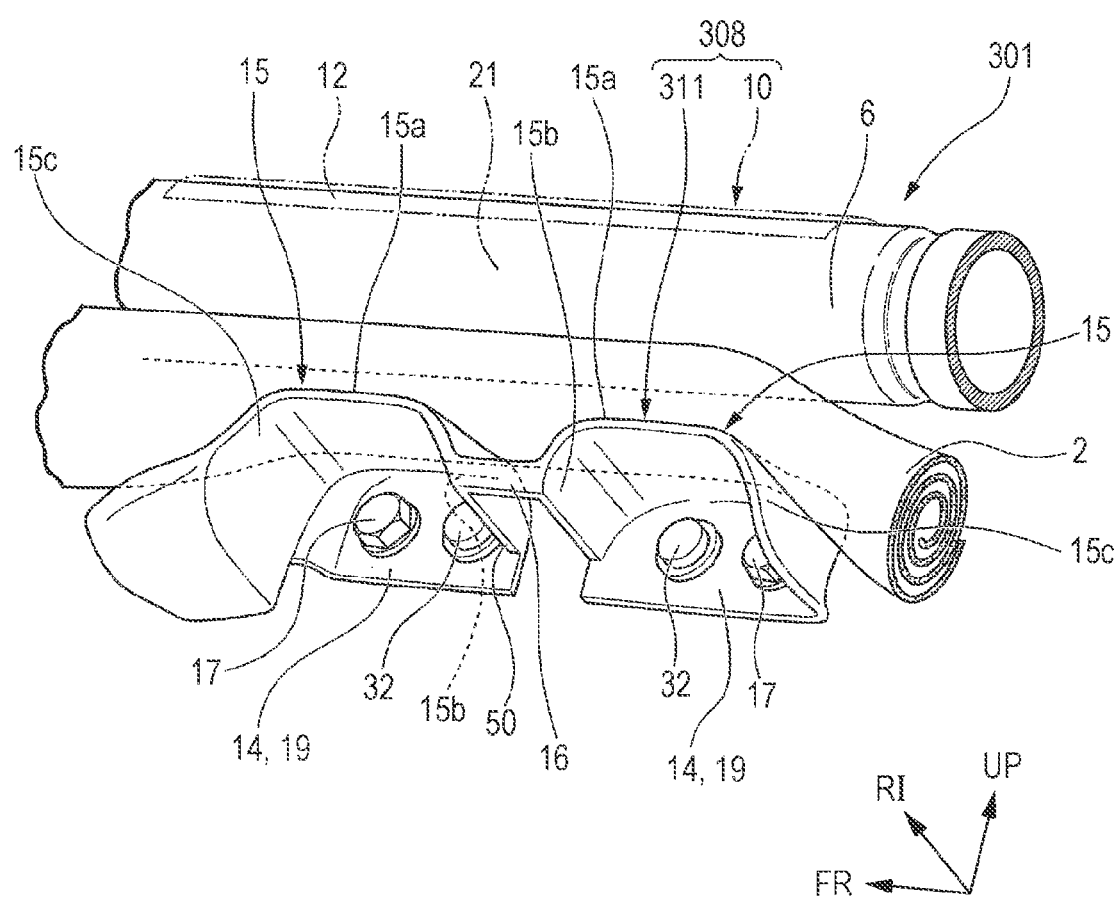
FIG. 8 is a perspective view of a portion of an airbag apparatus according to another modification of the another embodiment of the present disclosure, which corresponds to the area II illustrated in FIG. 1.

FIG. 7 illustrates a modification of this exemplary embodiment. FIG. 8 illustrates another modification of the exemplary embodiment. In the modification illustrated in FIG. 7, instead of forming the opening 40 having a substantially square shape at the center of each of the two side wall portions 15b and 15c of each of the restraining walls 15, a slit 45 extending in the up-down direction is formed in the vicinity of a connection portion of each of the side wall portions 15b and 15c with the joint wall 14. Alternatively, in a modification illustrated in FIG. 8, a notch 50 is continuously formed in part of the side wall portion 15b of each of the restraining walls 15 and in part of the connection wall 16 that connects the inner side wall portions 15b to each other. According to these modifications, the slit 45 or the notch 50 functions as a deformation allowance portion that allows deformation of the upper wall portion 15a of each of restraining walls 15. Thus, the modifications can provide an advantage that is substantially the same as illustrated in FIGS. 5 and 6.

It should be noted that the present disclosure is not limited to the above-described embodiments. Various design modification can be made within the scope and sprit of the present disclosure. For example, while the above exemplary embodiments have been described with reference to the fixing bracket 8 that fixes the inflator 6 to the vehicle body side and that is formed from the metal first bracket member 10 and the plastic second bracket 11 (111, 211, or 311), the fixing bracket 8 may be integrally formed from plastic or metal. Moreover, the above exemplary embodiments are described by using a side curtain airbag. However, the present disclosure may be applied to other types of airbag apparatus.

We claim:

1. An airbag apparatus of a vehicle comprising:
    an airbag body that is folded and attached on an upper portion of an interior side wall of the vehicle, the airbag body being deployed from the upper portion of the side wall into a curtain shape if an impact shock is input to the vehicle;
    an inflator disposed above the folded airbag body along a lengthwise direction of the airbag body, the inflator supplying high pressure gas to the airbag body when the impact shock is input to the vehicle; and
    a fixing bracket fixing the inflator to the upper portion of the side wall and including a fastening portion fixed to the upper portion of the side wall at a position below the inflator;
    wherein the fixing bracket further includes a restraining wall extending to an inward direction of the vehicle at a position below the inflator to support the folded airbag body and restrain the folded airbag body from displacing downward, and
    wherein the restraining wall is disposed below the folded airbag body and the fastening portion is disposed below the restraining wall.

2. The airbag apparatus of a vehicle according to claim 1, wherein the fastening portion is fixed to the upper portion of the side wall by using a bolt, and the restraining wall extends inwardly parallel to a fastening axis of the bolt.

3. The airbag apparatus of a vehicle according to claim 2, wherein the fastening portion includes a through-hole to receive the bolt, and the restraining wall is disposed above the through-hole.

4. The airbag apparatus of a vehicle according to claim 1, wherein the restraining wall has a substantially inverted-U shape in section.

5. The airbag apparatus of a vehicle according to claim 1, wherein the restraining wall is formed of a deformable material.

6. The airbag apparatus of a vehicle according to claim 1, wherein the fixing bracket extends in an up-down direction of the vehicle, and includes an inflator support portion at an upper end portion thereof and the fastening portion at a lower end portion thereof.

7. An airbag apparatus of a vehicle comprising:
    an airbag body that is folded and attached on an upper portion of an interior side wall of the vehicle, the airbag body being deployed from the upper portion of the side wall into a curtain shape if an impact shock is input to the vehicle;
    an inflator disposed above the folded airbag body along a lengthwise direction of the airbag body, the inflator supplying high pressure gas to the airbag body when the impact shock is input to the vehicle; and
    a fixing bracket fixing the inflator to the upper portion of the side wall and including a fastening portion fixed to the upper portion of the side wall at a position below the inflator;
    wherein the fixing bracket further includes a restraining wall extending to an inward direction of the vehicle at a position below the inflator to support the folded airbag body and restrain the folded airbag body from displacing downward,
    wherein the folded airbag body is put between the inflator and the restraining wall, and wherein a distance between the inflator and the restraining wall is set such that the folded airbag body is compressed between the inflator and the restraining wall.

8. The airbag apparatus of a vehicle according to claim 7, wherein the restraining wall has a deformation allowance portion that facilitates deformation of the restraining wall caused by a deployment pressure of the airbag body.

9. The airbag apparatus of a vehicle according to claim 8, wherein the deformation allowance portion is a reduced-thickness portion formed in the restraining wall.

10. The airbag apparatus of a vehicle according to claim 9, wherein the reduced-thickness portion is one of an opening and a notch formed in the restraining wall.

11. The airbag apparatus of a vehicle according to claim 8, wherein the restraining wall includes an upper wall portion and a side wall portion, and the deformation allowance portion is formed in the side wall portion.

* * * * *